United States Patent
Fabjański (10) Patent No.: US 12,556,527 B2
(45) Date of Patent: Feb. 17, 2026

(54) PACS MODIFICATION TO INCORPORATE LACS AUTHENTICATION

(71) Applicant: ASSA ABLOY AB, Stockholm (SE)

(72) Inventor: Krzysztof Grzegorz Fabjański, Bielsko-Biala (PL)

(73) Assignee: ASSA ABLOY AB, Stockholm (SE)

( * ) Notice: Subject to any disclaimer, the term of this patent is extended or adjusted under 35 U.S.C. 154(b) by 74 days.

(21) Appl. No.: 18/551,056

(22) PCT Filed: Apr. 8, 2021

(86) PCT No.: PCT/EP2021/059213
§ 371 (c)(1),
(2) Date: Sep. 18, 2023

(87) PCT Pub. No.: WO2022/214184
PCT Pub. Date: Oct. 13, 2022

(65) Prior Publication Data
US 2024/0163273 A1    May 16, 2024

(51) Int. Cl.
*H04L 9/40* (2022.01)
*H04W 12/08* (2021.01)

(52) U.S. Cl.
CPC ...... *H04L 63/0807* (2013.01); *H04L 63/0823* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 10,742,638 B1 | 8/2020 | Fischer et al. | |
| 2012/0280783 A1* | 11/2012 | Gerhardt | H04W 12/06 340/5.6 |

(Continued)

FOREIGN PATENT DOCUMENTS

| | | |
|---|---|---|
| CN | 103635940 | 3/2014 |
| CN | 108475447 | 8/2018 |

(Continued)

OTHER PUBLICATIONS

"International Application Serial No. PCT EP2021 059213, International Preliminary Report on Patentability mailed Oct. 19, 2023", 8 pages.

(Continued)

*Primary Examiner* — Brandon Hoffman
(74) *Attorney, Agent, or Firm* — Schwegman Lundberg & Woessner, P.A.

(57) ABSTRACT

A method of integrating a logical access control system with a physical access control system is disclosed. A soft token is received at a hardware accessory from a client device of a user. The soft token includes a payload. The payload includes information about the user that is stored in a user profile of the logical access control system. Based on a verifying of the soft token using a certificate extracted from a trust store of the hardware accessory, the information about the user that is included in the payload is parsed. Based on the information about the user satisfying one or more access criteria of a reader associated with a physical access control system, the reader is triggered. The triggering includes emulating a transaction associated with the physical access control system.

20 Claims, 9 Drawing Sheets

(56) References Cited

U.S. PATENT DOCUMENTS

2012/0280789 A1   11/2012  Gerhardt et al.
2014/0059676 A1    2/2014  Wendling et al.
2016/0080614 A1    3/2016  Hollinger
2016/0180614 A1    6/2016  Micali et al.
2019/0356529 A1* 11/2019  Gulati .................. H04L 9/0897

FOREIGN PATENT DOCUMENTS

| CN | 108476227 | 8/2018 |
|---|---|---|
| CN | 110622222 | 12/2019 |
| CN | 117178304 | 12/2023 |
| WO | 2012151290 | 11/2012 |
| WO | 2019129351 | 7/2019 |
| WO | 2022214184 | 10/2022 |

OTHER PUBLICATIONS

"International Application Serial No. PCT EP2021 059213, International Search Report mailed Dec. 20, 2021", 5 pgs.

"International Application Serial No. PCT EP2021 059213, Written Opinion mailed Dec. 20, 2021", 6 pgs.

"European Application Serial No. 21717440.8, Communication Pursuant to Article 94(3) EPC mailed Jul. 3, 2025", 7 pgs.

"European Application Serial No. 21717440.8, Response Filed May 13, 2024 to Communication pursuant to Rules 161(1) and 162 EPC mailed Nov. 15, 2023", 10 pgs.

"Chinese Application Serial No. 202080078972.6, Office Action mailed Nov. 1, 2025", with English translation, 19 pages.

* cited by examiner

```
POST https://test.aaas.hidcloud.com/configuration/tfde03416930441822525025/v2/User/AttributeType {
    "schemas": [
        "urn:hid:scim:api:idp:2.0:userattribute:Type"
    ],
    "id": "ATR_SIO",
    "meta": {
        "resourceType": "UserAttributeType",
        "location": "https://test.aaas.hidcloud.com/configuration/tfde03416930441822525025/v2/User/AttributeType/ATR_SIO",
        "version": "1"
    },
    "name": "ATR_SIO",
    "notes": "ATR_SIO"
}
```

FIG. 5

```
Raw ID Token:
eyJraWQiOiIxNjA0NDE4MjY0MzEzIiwidHlwIjoiSldUIiwiYWxnIjoiUlMyNTYifQ.
eyJhdF9oYXNoIjoiZFJBNjIzdFM5STR6NmhQdkPBYzlLdyIsInN1YiI6InRlc3RTaGFya0B0ZXN0LnBsIiwiYXVkIjoiMjE5MjY0OTE4MDg1ODUw
MTczMjEzMzczODYzMDAwODU0NjQ1MTc1MzUxNTA5ODM1IiwiYWNyIjoidXJuOmhpZGFhYXM6cG9saWN5OmP0X3N0ZHB3ZCIsIkFUU19TSU8iOiIz
MDMzODBwNTAxODc0MTg4MTNBNTAyMDUwMEE2MDk4MTAyODE3MDA0MDMwMzAwMDhBNzE3ODUxNUJBMjE4OEUwRjFCNjYzQzA3QTQ0M0Q2NzA2MzFB
MjI5RTJDODRFQzQ2NUE5MDIwNTAwMDUwMCIsImF1dGhfdGltZSI6MTYwNjc0MzA4NCwiZ3JvdXBpZHMiOlsiVUdfUk9PVCJdLCJyb2xlcyI6WyJ0
aGViZSJdLCJpc3MiOiJodHRwczpcL1wvdGVzdC5hYWFzLmhpZGNsb3VkLmNvbVwvaWRwXC90ZmRlMDM0MTY5MzA0NDE4MjI1MDI1XC9hdXRobiIs
ImV4cCI6MTYwNjc0NjY4NCwiaWF0IjoxNjA2NzQzMDg0LCJzaWQiOiJlMGhKUkMxSlFTMDBWQzVUUlZOVFNVOU9MakY5TG1Vd2JGZFFWVGRDSzI5
dU5uWlViRVpSVEUxc1UxQkdRM01yUlhOUlZWWlVUVzR3ZFhneGFFcBjV1ZNU1dWRFNqVX1TWFJKTmxsNWRHUmlOV0pKV0M4clFsTlphVzF6TUdZ
cmRUVTJUVkpsTm5GePNXeDVVbEpSWldZM1IyZ31Za2cwYW1JPSJ9.VSi4BwVJq__-
n5xkl36IScJqiDZgCu_TPADW3mWlcqiR2ThnmUhm4T1Tcu8LlmvTOSYBeQdv-NNmN0a3ZTZnS3PVq2L5ZwPfJfQ9yAhaZZ91X-
xD3cp86ODAG68vQC0zbR9SZGoxkhmBe0fo4DlMwzHBfEXqt5YvfyPmNrwpe4nz_P74fpJ5ajIt2VQC_rfxc_TND0usCwAo0mOYXQGVLyFzAOtYs8
HKZRO99nZNpu5Zb41w9A9AlfEEprs8sseDpu-jNTWVoBviVQ7bRJXZKrNkyQzrZfPhsOhdy4Yo2IZR-
qH0vt_clRLUCe6Eo9q8g7K9tu7fjgjnLgLbNNlHcw.

Header:
{
  "kid": "1604418264313",
  "typ": "JWT",
  "alg": "RS256"
}
Body:
{
  "at_hash": "dRA623tS9I4z6hPvAAc9Kw",
  "sub": "testShark@test.pl",
  "aud": "219268918085850173213373863000854645175351509835",
  "acr": "urn:hidaaas:policy:at_stdpwd",
  "ATR_SIO":
"303381050187418813A5020500A6098102817004030300008A7178515BA2188E0F1B663C07A443D670631A229E2C84EC465A90205000500"
,
  "auth_time": 1606743084,
  "groupids": [
    "UG_ROOT"
  ],
  "roles": [
    "thebe"
  ],
  "iss": "https://test.aaas.hidcloud.com/idp/tfde034169304418225025/authn",
  "exp": 1606746684,
  "iat": 1606743084,
  "sid":
"e0hJRC1JQS00VC5TRVNTSU9OLjF9LmUwbPdQVTdCK29uNnZUbEZRTE1sU1BGQ3IrRXNRVVZUW4wdXgxaEpPcWVMSWVDSjUySXRJNll5dGRiNWJ
JWC8rQlNZaW1zMGYrddTU2TVJlMnPxSWx5UlJRZWY3R2gyYkg0amI="
}
Signature:
VSi4BwVJq__-n5xkl36IScJqiDZgCu_TPADW3mWlcqiR2ThnmUhm4T1Tcu8LlmvTOSYBeQdv-NNmN0a3ZTZnS3PVq2L5ZwPfJfQ9yAhaZZ91X-
xD3cp86ODAG68vQC0zbR9SZGoxkhmBe0fo4DlMwzHBfEXqt5YvfyPmNrwpe4nz_P74fpJ5ajIt2VQC_rfxc_TND0usCwAo0mOYXQGVLyFzAOtYs8
HKZRO99nZNpu5Zb41w9A9AlfEEprs8sseDpu-jNTWVoBviVQ7bRJXZKrNkyQzrZfPhsOhdy4Yo2IZR-
qH0vt_clRLUCe6Eo9q8g7K9tu7fjgjnLgLbNNlHcw
```

*FIG. 6*

```
POST https://test.aaas.hidcloud.com/idp/tfde034169304418225025/authn/register Body:
{
    "redirect_uris":[
        "https://client.example.org",
        "https://client2.example.org",
        "http://localhost:8080/samplesAuthorizationCode.html"
    ],
    "client_name":"test",
    "token_endpoint_auth_method":"client_secret_basic",
    "hid_client_channel":"CH_EXTRAPP",
    "hid_client_pwd_policy":"AT_SYSLOG",
    "hid_client_pki_policy":"AT_JWT",
    "hid_user_channel":"CH_EXTRAPP",
    "hid_user_authn_policy":"AT_STDPWD",
    "hid_client_group":"UG_CLIENTID",
    "hid_client_scopes":"{\"scopes\":[{\"thebe\":{\"claims\":{\"userinfo\":{\"usr.ATR_EMAIL\":{\"essential\":
true},\"usr.ATR_MOBILE\":{\"essential\":false},\"usr.CITY\":{\"essential\":false}},\"id_token\":{\"usr.
groupids\":{\"essential\":true},\"usr.roles\":{\"essential\":false}}}},{\"openid\":{\"userinfo\":{\"usr.
ATR_EMAIL\":{\"essential\":true},\"usr.ATR_MOBILE\":{\"essential\":false}},\"id_token\":{\"usr.groupids\":{\"
essential\":true},\"usr.roles\":{\"essential\":false},\"acr\":{\"essential\":true}}},\"profile\"]}",
    "hid_client_consentprompt":"false",
    "jwks":{
        "keys":[
            {
                "kid":"uBY9ZRa5RQHkh2ur9EjbIKuq5pqYLO4VdayrHHqh6wo",
                "kty":"RSA",
                "n":"u5LTEobR6eAj-8Am14Icl6zoUHdWKXU9DOGmKpJPpEaqTDWlMVhi_K_-jj438L_JZDL3kfcLx6EiHjkW-
YV22TqzqdPlcvaZgk_XBHVsxNKzgqVsckAAqGSsPwaPLJBTOymJ3rILbSxEkawajKJLDEjIE4szbY_fYJ4O2tDoWJ0PMReIGvrb4g9FYtHVvJiFh
r3AvBqHxiZmJR7VENQAtxfqIEvc-ABG1RDAPasPZ7RNcEuFqqik9mnr5a16sH3wgMZkwZmcE-
0JZq6jD6U4czR1FMQapzRym0OFwLvf5EzqrUZmRMddqaOBcDe_IybZLFlZkstjh_HzEmiRCIDiIw",
                "e":"AQAB",
                "x5c":[
                    "MIIDbDCCAlSgAwIBAgIJAP8YPNRz0ts
/MA0GCSqGSIb3DQEBCwUAMEsxCzAJBgNVBAYTAlBMMQ8wDQYDVQQIDAZLcmFrb3cxDzANBgNVBAcMBktyYWtvdzEMMAoGA1UECgwDSElEMQwwCgY
DVQQLDANISUQwHhcNMjAxMTE4MTQ1ODQ3WhcNMzAxMTE2MTQ1ODQ3WjBLMQswCQYDVQQGEwJQTDEPMA0GA1UECAwGS3Jha293MQ8wDQYDVQQHDAZ
LcmFrb3cxDDAKBgNVBAoMA0hJRDEMMAoGA1UECwwDSElEMIIBIjANBgkqhkiG9w0BAQEFAAOCAQ8AMIIBCgKCAQEAu5LTEobR6eAj+8Am14Icl6z
oUHdWKXU9DOGmKpJPpEaqTDWlMVhi/K/+jj438L/JZDL3kfcLx6EiHjkW+YV22TqzqdPlcvaZgk
/XBHVsxNKzgqVsckAAqGSsPwaPLJBTOymJ3rILbSxEkawajKJLDEjIE4szbY
/fYJ4O2tDoWJ0PMReIGvrb4g9FYtHVvJiPhr3AvBqHxiZmJR7VENQAtxfqIEvc+ABGlRDAPasPZ7RNcEuFqqik9mnr5a16sH3wgMZkwZmcE+OJZq
6jD6U4czR1FMQapzRym0OFwLvf5EzqrUZmRMddqaOBcDe/IybZLFlZkstjh
/HzEmiRCIDiIwIDAQABo1MwUTAdBgNVHQ4EFgQU4i0eoo3V4werN9bUKCcqDU3j2kowHwYDVR0jBBgwFoAU4i0eoo3V4werN9bUKCcqDU3j2kowD
wYDVR0TAQH/BAUwAwEB/zANBgkqhkiG9w0BAQsFAAOCAQEAMFzm0dHg3Vydnk
/CkOBWIlLVXUVD7qm2BHVSxzEN8pYt4K4u6TrvfgzZbOXtQTLVbPxpJbOsTLiKwDpUMETM8b+6gV9pRpfmYmXky7iyEtojCit9Reh3IkvSGrXVdY
pVlomrkOA7kzD6V6PfJ3s9ZWL/V8pYGgQArIoDUaSX8xWEE31VwPYvcuwnL2vb72MCt7fTMeMPB+7BIyhYH9jj0+4DjIzS4uUcrLvHPmg56
/Udb9Whzjo36Ofrw/ObX456HBKcw/gVdyE7MNGr3xS3HpAj9R2YoZZ9rUHJAk9luCHLDXXKPM7Ge1R9+oe8f48jgXkT35H61Qn0F5b3sRNHyw=="
                ],
                "x5t#S256":"aTatVE199y2y4ZLZmxpYLJtCaGjb1mq1JYJ5eKV0SGg",
                "use":"enc"
            }
        ]
    },
    "id_token_encrypted_response_alg":"RSA-OAEP-256",
    "hid_ciba_callback_format_plain":"false"
}
```

*FIG. 7*

```
{
  "access_token":"K0\/4ngAAAXX6mgHKWj4ZRB40jSMNs1ax6xe8h89R",
  "id_token":"eyJjdHki0iJKV1QiLCJ1bmMi0iJBMjU2Q0JDLUhTNTEyI1w1YWxnIjoiU1NBLU9BRVAtMjU2In0.
CZM0uwjpW5zRcLggcuealy14HgaUDaqwDo3jveD2B1671fjYZwTf53feoS3NyAc-XCNvg2Su7YLMQz-7Ru4wuTtyOwxLhNcRqlje-
qVv6unAWThsvJfjy1SyP16UbF4j3AgVW3jTqdbfLm-U58RfUyv8HpawXq1EdwihtfHKsrlp-
bEEjNprUZKCNt4N1SrPigeiVY2kDwhgdKeexT2K1Q4McvOHWPbn9hu899cLlylob7XyBCeon7nWVrY2rVg_s5gGo_wpdJ9enKsX4sKnbyhr-
3w501OMmOINSA4-hHnj86_nBuh9TsAEWU_RbpL7-ZBXyvso0wOS4MaYtBvFQ.13Ut1p8_IiJsvN_8enUG5w.
UZTVjGFj5dVFVb07XxASu7EMjgpZJMoraEfwbMcexDzRKvBcje21MunLxyLNnRopg7XNcX2M2chAKYyXy1QwTBzhqF0jV85esQKoc4bLsDOUGRQz
WP_gBY0SAppCKY3GDk1ZnQ4mq1XD3q3jtxcUArUN8qhVWqwZkBay17p3ANCKWQgUqqwYhoz4oMTBTPQXxuaSeoZ0X9S3f5We1TXOPUfXFPpOF5W
17Uu31LtXPeCVkdTuPBeQq4jKVbpBN3QfjZrp1HLVbgpantHOE4Sb1dRoLUuDZwZ1CFmnr_A9voHdQTR8YtbFBy88yhr7wPdHg4k_Or_1MigpgNY
_ojV4g_CsDa77I78Sn1-FIPky5kHQ2RDiTgJC-
ESDurALfMjUSpWZ_7g30QkniAKHZ6ojn0UZPLF6o9kfi1lQYtzLUsBNd5sQRQXIXv25e10kYOuUydKVYN7yx-
ZdB17MUJ90ewbgKFXHumTKM2JOSDvpd9wPiv30mh7cfzu12NtWDsEdWRmyCKosKGksHme2_Fgu-HOP8BbDiw4y_tecJm3sfFvo2rUgJ3_s9QZ-
Yuzso1UN-i-14D7OjsrFs5aC9GPng47HQgyby2Cc4e7NZ-z1BV-
0jTwhM4ccmgJ9IPiQ_Co09Q3FKb5xG_ZCHiYAJjcMFr_jGRUhLKj0e3jLfBSVV9t1knCaPYvUBWuu1yWqn9P2dAaHtJYv5Td_xPd4aJK9vmhFe
YNAP9XJ6iGU1LuxRoe3FNHyUb0zvQr7kDi3EzWzfzipONcoC1ksRGIWsaPwRCHpVBcJXdKtFBgnhjgiEUWQ13akZ5BX9o5cOFyQbE8MkcGfFzJJ
jY09CJaRySWOgEy0myYMOZ_dmr____Ad4z-vC1R6zDE2n7NNOoSYFMxMgCzuHhtw_L-
JBTe2DRuFaS21_5kQ9zBMi1iZBQAvo8HubLEdFqw1RgZ7sJo8578QHVmobBdoFDpNcD3gF2H9woB11VmpYNGsg17UwjGaAjQrVBQwdkzoa7W--
17w3_f38yL26F4AbdKf1wSx1Pne11M_41TTWvJXISU9QWXXVH17Dvx7A4yWwydGrUHqfQCWy6h-
BF1WUKw2YaRmlaeRHK4CqK1oLByx2ctriZV5h2sDmJEBeoLB-uQ2kbhu-YOO8nmYVMsEG785T9hvOzb57ZgAwJVSTy4Qz6e0fnvNeLisbkSKP-
uWEtzt_QFONgy-FpmW6NOkf0Anp8Sx3Obz9M3Eiz4tsMFUB80hK3SKB8eJN-
uy5jlj5SRm1jRPJOJQRWCiyzBw9914YdaQaM__1Fv7Vh7dC_zKH435ZZIBb-1KJ77rX0E1uB-1KCCvKX3v3B9M9TfTgKo-
jBJ6v6ku1JC_vot1bnpjEF7fUTh3OJhoyNKKG-
KiYu52mK6ftgTvhk9xHRsrdAVob0qaNpo6OyuTzrL61ZzigohKX7lVFUVYKDsVTy6dD1Eao1A5.
ocDXT5oBa1qtJvyI3IbY96kWm6H50gJE5114uurDROO",
  "context":{
    "LEVEL_OF_ASSURANCE":"urn:hidaaas:policy:at_stdpwd"
  },
  "token_type":"Bearer",
  "expires_in":3600
}
```

PACS MODIFICATION TO INCORPORATE LACS AUTHENTICATION

CROSS REFERENCE TO RELATED APPLICATIONS

This application is a U.S. National Stage of International Application No. PCT/EP2021/059213, filed on Apr. 8, 2021, which is incorporated by reference herein in its entirety.

TECHNICAL FIELD

The present disclosure generally relates to physical access control systems (PACS) and, in one specific example, to modifying a PACS to incorporate authentication techniques derived from logical access control systems (LACS).

BACKGROUND

Existing physical access control systems (PACS) are hard to maintain and not very open for third-party system integration. For example, it is difficult to adapt an existing PACS to take advantage of new computing environments or use newly-developed authentication and authorization standards, such as those used in logical access control systems (LACS). PACS and LACS are typically segregated from one another and determining whether and/or how they can interoperate is a difficult problem.

BRIEF DESCRIPTION OF THE DRAWINGS

FIG. 6 shows an exemplary JWT format.

FIG. 7 shows an exemplary JSON format response returned from an IdP server after a client registration (e.g., an OpenID dynamic client registration).

FIG. 8 shows an exemplary JSON format response containing access token and id token (encoded) retruend by an IdP (E.g., in an OpenID Connect authorization flow).

DETAILED DESCRIPTION

In the following description, for purposes of explanation, numerous specific details are set forth in order to provide an understanding of example embodiments of the present subject matter. It will be evident, however, to those skilled in the art that example embodiments may be practiced without these specific details.

A method of integrating logical access control systems (LACS) with a physical access control systems (PACS) is disclosed. A soft token is received at a hardware accessory from a client device of a user (e.g., a mobile phone of the user). The soft token was previously generated or received at the client device based on an accessing of a logical profile of the user by the client device via one or more services of the logical access control system. The soft token includes a payload. The payload includes information about the user that is stored in the logical profile. Based on a verifying of the soft token using a certificate extracted from a trust store of the hardware accessory, the information about the user that is included in the payload is parsed. Based on a determination that the information about the user satisfies one or more access criteria of a reader associated with a physical access control system, the reader is triggered. The triggering includes emulating a transaction associated with the physical access control system.

This method and example embodiments disclosed herein may be implemented by a specially-configured computer system. The computer system may be specially configured by one or more non-standard modules (e.g., hardware modules or software modules implementing operations described herein, which include non-routine and unconventional operations and/or a non-routine or unconventional combination of operations) and implemented by one or more computer processors of the computer system. This method and example embodiments disclosed herein may be embodied as instructions, as described herein, stored on a machine-readable medium that, when executed by one or more processors of a computer system, cause the computer system to perform one or more operations described herein, which include non-routine and unconventional operations and/or a non-routine or unconventional combination of operations.

The details of one or more variations of the subject matter described herein are set forth in the accompanying drawings and the description below. Other features and advantages of the subject matter described herein will be apparent from the description and drawings, and from the claims.

Figure 1:
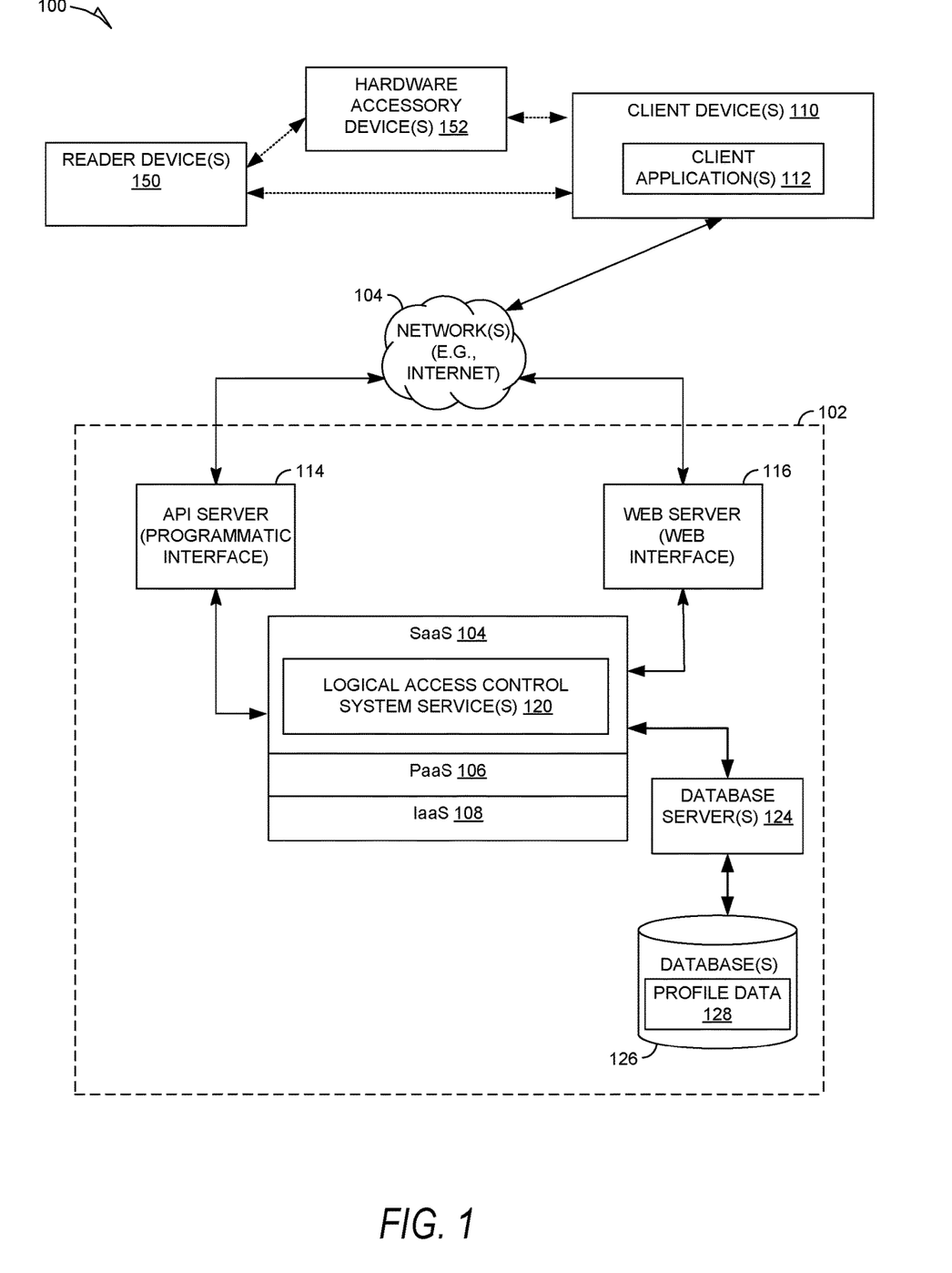
FIG. 1 is a network diagram illustrating a client-server system, in accordance with some example embodiments.

FIG. 1 is a network diagram depicting a system 100 within which various example embodiments may be deployed.

In example embodiments, one or more hardware accessory device(s) 152 are configured to process tokens received (e.g., using near-field communication, or Bluetooth technology) from one or more client device(s) 110, such as a mobile phone. In example embodiments, the tokens include information about a user of a device that were previously received by the client device from one or more logical access control system service(s) 120. In alternative embodiments, one or more of the tokens may be received directly from the one or more logical access control service(s) 120 via a networking component incorporated into the accessory device 152 as an enrichment of the accessory device 152. In example embodiments, the accessory device 152 is configured as a class of Internet of Things (IoT) device that may be managed remotely (e.g., via one or more cloud-based applications). Based on whether the information about the user satisfies access criteria associated with a one or more reader device(s) 150 of a physical access control system, the hardware accessory device 152 triggers the reader device. For example, the hardware accessory device 152 may be configured to send and/or receive one or more communications to or from the reader device 152 in order to emulate a one or more communications that would normally occur between the reader device and a smart device, such as a smart card, that has been associated with the user. For example, the hardware accessory device 152 may send and/or receive one or more communications to emulate a PACS transaction supported by the reader, such as a SEOS transaction. In this way, authentication of a user based on a LACS can be integrated into a PACS without modifying any infrastructure associated with the PACS. In alternative embodiments, the functionality of the hardware accessory device may be integrated into the reader device such that a separate hardware accessory device is not required.

A networked system 102, in the example form of a cloud computing service provides server-side functionality, via a network 104 (e.g., the Internet or Wide Area Network (WAN)) to one or more endpoints (e.g., client devices 110). FIG. 1 illustrates client application(s) 112 on the client machines 110. Examples of client application(s) 112 may include a web browser application, such as the Internet Explorer browser developed by Microsoft Corporation of Redmond, Washington or other applications supported by an operating system of the device, such as applications supported by Windows, iOS or Android operating systems. Such applications may include access control applications, such as applications used for accessing a restricted space. Each of the client application(s) 112 may include a software application module (e.g., a plug-in, add-in, or macro) that adds a specific service or feature to the application.

An API server 114 and a web server 116 are coupled to, and provide programmatic and web interfaces respectively to, one or more software services, which may be hosted on a software-as-a-service (SaaS) layer or platform 104. The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the applications or services 120 are shown in FIG. 1 to form part of the networked system 102, in alternative embodiments, the applications 120, including services supporting user authentication (e.g., using OpenID Connect, OAuth protocol, and/or other authentication protocols), may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications or services 120 could also be implemented as standalone software programs. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. For example, the third-party applications may, utilizing information retrieved from the networked system 102, support one or more features or functions on a website hosted by the third party.

The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 and so as to allow the server applications 120 to share and access common data. The server applications 120 may furthermore access one or more databases 126 via the database servers 124. In example embodiments, various data items are stored in the database(s) 126, such as user profile data items 128, which may include one or more access tokens, as described in more detail below.

Navigation of the networked system 102 may be facilitated by one or more navigation applications. For example, a search application (as an example of a navigation application) may enable keyword searches of data items included in the one or more database(s) 126 associated with the networked system 102. A browser application may allow users to the data items 128. Various other applications may be provided to supplement the search and browsing applications, such as to allow editing of the data items 128 within a user interface.

Figure 2:
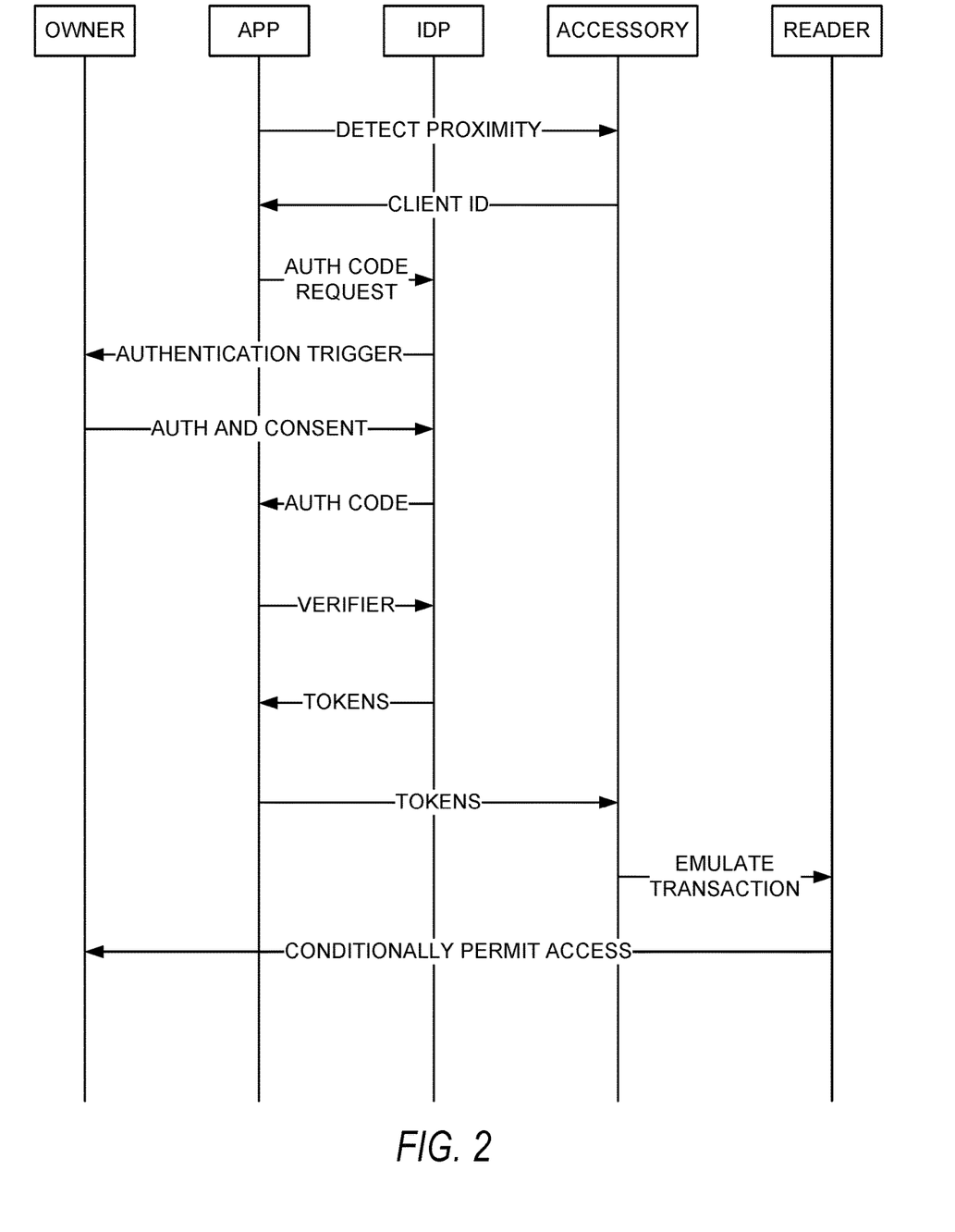
FIG. 2 is a sequence diagram illustrating example operations of example components of a system in which a hardware accessory device is used to integrate a LACS into a PACS without modifying any of the infrastructure of the PACS.

FIG. 2 is a sequence diagram illustrating example operations of example components of a system in which a hardware accessory device is used to integrate a LACS into a PACS without modifying any of the infrastructure of the PACS.

In example embodiments, a hardware accessory detects that a client device has come within a proximity to the hardware accessory device. For example, it is determined that a strength of a signal between the client device and the hardware accessory device, such as Bluetooth signal RSSI strength, has exceeded a threshold strength. As another example, a passage intent of the user could be detected (e.g., via ultrawide band (UWB) secure tagging).

In response to the detection of the proximity of the client device, the hardware accessory sends a client ID of itself to an application executing on the client device. In example embodiments, the hardware accessory sends a ClientID together with a secret that is stored by the hardware accessory (e.g., via a secure storage component of the hardware accessory) or that is dynamically passed to the hardware accessory (e.g., from the client device 112 or the logical access control system 120). To address security concern, the hardware accessory may send a JWT (soft token) signed by the private key that is kept in the secure storage of the hardware accessory. This JWT may then be used to authenticate the hardware accessory ClientID through which the end-user is sending a user credential, thus confirming the user's identity. In example embodiments, for an OpenID Connect implementation, the JWT is used to do a first step of an OpenID Connect two-step authentication).

Upon receiving the client ID, the application sends an authentication code request and a code challenge to an authentication endpoint on an authorization server, such as an identity provider (e.g., via the logical access control system service(s) 120).

In response to the authentication code request, the identity provider initiates an authentication process by, for example, causing a login prompt to be displayed on a device of the user (e.g., within the application) or sending a push notification (e.g., for password-less authentication).

Upon receiving authorization and consent from the user, the authorization server provides an authorization code to the application.

Upon receiving the authorization code, the application sends the authorization code and a code verifier to an authentication endpoint of the authorization server (e.g., an/oauth/token endpoint) (e.g., via the logical access control system service(s) 120).

Upon receiving the authorization code and code verifier, the authorization server validates the code verifier and code challenge. In example embodiments, the authentication may ask for multi-factor authentication (e.g., based on an access token scope). Then the authorization server returns an ID token and access token. In example embodiments, the ID token and/or the access token may be a JWS or JWE token.

Upon receiving the ID token and access token, the application verifies the claims or roles of the users, adjusting a user interface of the application to reflect the verification. In example embodiments, the claims could include a GeoTag. The application then sends the verified access token and ID token (e.g., as a JWT or JWE token) to the hardware accessory device.

Upon receiving the ID token and access token, the accessory checks the integrity and authenticity of the ID token and access token (e.g., for a JWT token) or the confidentiality of the ID token and access token (e.g., for a JWE token). For example, the hardware accessory verifies the token based on the identity providers it trusts through secure provisioning or secure change management.

Based on the verification of the token and a determination that decrypted and/or data parsed from the payload of the token satisfies one or more access criteria, the hardware accessory triggers a transaction with the reader (e.g., as if the hardware accessory is a smart card configured to activate the reader). For example, the hardware accessory initiates a transaction that is compatible with a technology of the reader application, such as a Seos transaction. The hardware accessory then sends identity information to the reader application, such as identify information of the user that was extracted from a payload of the ID token and access token. In example embodiments, the identity information is sent to the reader as a single, secure object, such as an SIO object.

Upon receiving the identity information via the transaction from the hardware accessory, the reader conditionally provides access to the secure area (e.g., by unlocking a door). In example embodiments, the providing of the access to the user is based on the validated ID token information claims and access token scope, such a s role that is assigned to the user and stored in a LACS profile of the user.

In example embodiments, one or more of the JWT (JWS) or JWE is reused directly in the process of emitting the information (e.g., the SIO object). In example embodiments, this information is further written under the profile of the existing LACS user (e.g., the user for which the Access Token and ID Token has been issued). In example embodiments, security would be provided from the JWE being encrypted on the level of payload with the accessory private RSA key (provisioned during the configuration phase of the accessory).

In example embodiments, the accessory has the capability of ensuring both Bluetooth and NFC connectivity and optionally has a secure element for storing any type of sensitive information, such as a key used in asymmetric cryptography supported by the LACS (e.g., a private RSA key), which could be provisioned during a configuration phase.

Here's an example use case:

1. Accessory device is configured to work only with a concrete reader (e.g., and associated lock). It is be placed near the original PACS reader to ensure connectivity (e.g., via Bluetooth). A unique identifier associated with the reader is stored on the accessory side.
2. The accessory is paired with the PACS reader (e.g., using Bluetooth). In this case, a static card may be emulated by the accessory and always honored by the reader. However, in other use cases, such as when an SIO is passed in user attributes, the pairing between the reader and accessory may be optional.
3. During configuration part, it is ensured that the accessory can establish a transaction (e.g., a Seos transaction) with the PACS reader. Therefore, it acts as the classical smart card (but with fixed keys).
4. The accessory is provisioned with private and public key as well as one or more additional public keys for trusting one or more external IdP providers.
5. During logical authentication, by using the client device, the user authenticates against the IdP and gets the valid access and ID token from the IdP server as per an authorization code flow (e.g., such as the flow provided by the OpenID connect standard). This is further emitted to the accessory, which performs a validation, including:
   validating expiration token of tokens
   checking signature of the tokens—using the public trusted certificate provisioned to the reader during the configuration phase
   (optionally) decrypting the JWE
   reading out the reader identifier from the ID Token attributes and, if matches with the one in the accessory, proceed furthers; otherwise rejecting the access.
   (optionally) extracting the user information (e.g., an SIO object) from the ID Token attributes
   Performing the transaction with the reader
   (optionally) injecting the user information into a secure message session, allowing the PACS reader to identify the user by the user's individual user information (e.g., an SIO, such as a user's customer attribute, stored in a user's profile); and, in example embodiments, letting the reader decide about physical access grant.

In alternative embodiments, a PKI (JWT) client credential flow may be used. In this case, the accessory may emit the JWT (signed cryptographically by the private key stored in the secure storage of the accessory). JWT is used by the client device (112) to get the bearer token (authentication of the ClientID) with the received bearer token, user is providing his credential and after confirming his identity he gets ID toke and access token from the IdP.

Figure 3:
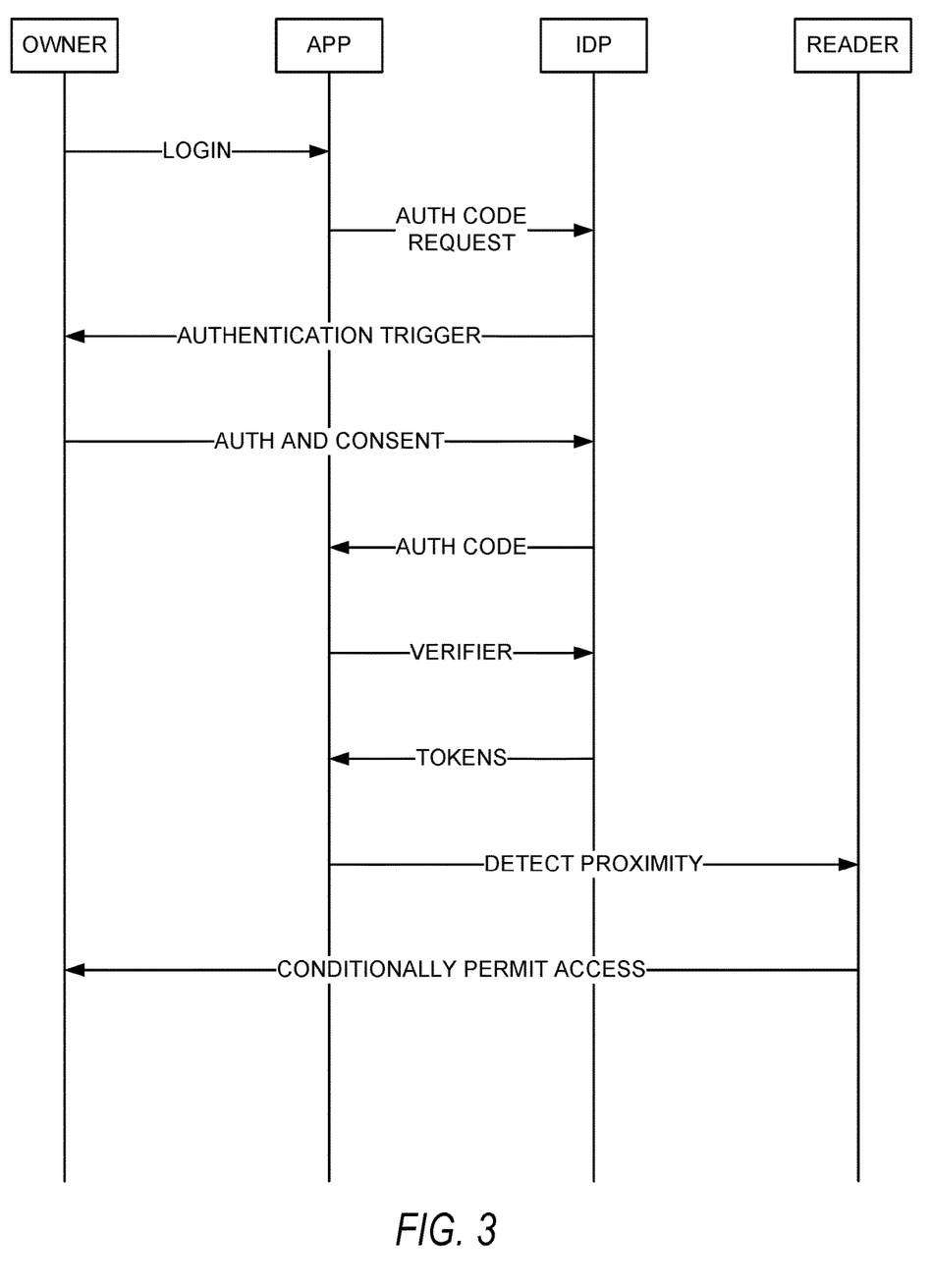
FIG. 3 is a sequence diagram illustrating example operations of example components of a system in which infrastructure of a PACS has been modified such that aspects of a LACS are integrated into a PACS.

FIG. 3 is a sequence diagram illustrating example operations of example components of a system in which infrastructure of a PACS has been modified such that aspects of a LACS are integrated into a PACS.

In example embodiments, an access control system application executing on a device of a user is provided with login credentials input by a user (e.g., a password-base credential or any type of authenticator used by the LACS system, such as a biometric or adaptive authenticator that is a risk based). The application the generates a code verifier and a code challenge and sends an authentication code request and the code challenge to an authentication endpoint of an authorization server, such as an identity provider (e.g., via the logical access control system service(s) 120).

In response to the authentication code request, the identity provider initiates an authentication process by, for example, causing a login prompt to be displayed on a device of the user (e.g., within the application) or sending a push notification (e.g., for password-less authentication).

Upon receiving authorization and consent from the user, the authorization server provides an authorization code to the application.

Upon receiving the authorization code, the application sends the authorization code and a code verifier to an authentication endpoint of the authorization server (e.g., an/oauth/token endpoint) (e.g., via the logical access control system service(s) 120).

Upon receiving the authorization code and code verifier, the authorization server validates the code verifier and code challenge. In example embodiments, the authentication may ask for multi-factor authentication (e.g., based on an access token scope). Then the authorization server returns an ID token and access token. In example embodiments, the ID token and/or the access token may be a JWS or JWE token.

Upon receiving the ID token and access token, the application verifies the claims or roles of the users, adjusting a user interface of the application to reflect the verification. The application then sends the verified access token and ID token (e.g., as a JWT or JWE token) to the hardware accessory device.

Upon receiving the ID token and access token, the accessory checks the integrity and authenticity of the ID token and access token (e.g., for a JWT token) or the confidentiality of the ID token and access token (e.g., for a JWE token). For example, the hardware accessory verifies the token based on the identity providers it trusts through secure provisioning or secure change management.

In example embodiments, a reader detects that the client device has come within a proximity to the reader. For example, it is determined that a strength of a signal between the client device and the reader, such as Bluetooth or UWB signal RSSI strength, has exceeded a threshold strength.

Based on validation of the ID token and access token information, such as identify information of the user that was extracted from a payload of the ID token and access token, the reader conditionally provides access to the secure area (e.g., by unlocking a door). In example embodiments, the providing of the access to the user is based on the validated ID token information claims and access token scope, such a s role (e.g., "thebe") that is assigned to the user and stored in a LACS profile of the user. In example embodiments, the validation process is delegated to one or more controllers connected to the reader.

In example embodiments, an Access token is validated by the reader as a part of standard JWT validation. The Access token can be further encrypted and represented by JWE (see https://tools.ietf.org/html/rfc7516). In example embodiments, the reader has the Public Certificate of each IdP it trusts and uses it to verify the signature of the JWT and check the integrity of it.

After decoding the JWT, the reader may check claims of the token and verify the access. See the example below:

```
{
"alg": "RS256",
"typ": "JWT"
}
.
{"iss": "https://URL_OF_IDP_WHICH_READER_TRUSTS/",
"aud": "ID_OF_THE_LOCK",
"sub": "ID_OF_THE_USER",
"scope": "read write",
"iat": ISSUEANCE_TIMESTAMP,
"exp": EXPIRATION_TIMESTAMP }
```

In example embodiments, the public certificate is seeded during provisioning or secure change management of the reader. In example embodiments, the logic responsible for granting access may: 1. Verify the JWT with the public certificate representing a concrete IDP by reading the iss field and taking the right Public Certificate from the memory of the Reader and 2. Match the ID_OF_THE_LOCK.

In example embodiments, the process of validation is implemented by controllers behind the readers. The controllers may dynamically query concrete endpoints of the IdP to confirm the identity of the person accessing the reader (e.g., to unlock a door). This might include further verification of user information by querying the UserInfo endpoint of the IdP server. Analogically, more types of flows may re-used different OpenID Connect flows as well. In example embodiments, in the case of physical smart cards, a Client Credential flow is used in which each of the cards is treated as a separate Client represented with unique ClientID. In those types of flows, a change of roles would also be needed (as a card would not have possibility of requesting the temporary access token), and this may be delegated based on the clientID and secret back to the reader/controller.

Thus, in example embodiments, many existing IdP systems spread across Public Internet may be reused, simplifying the provisioning and secure change management of credentials associated to certain identities significantly. Furthermore, one physical card or device could be used to provide or prevent access to both physical facilities and logical systems at the same time.

Figure 4:
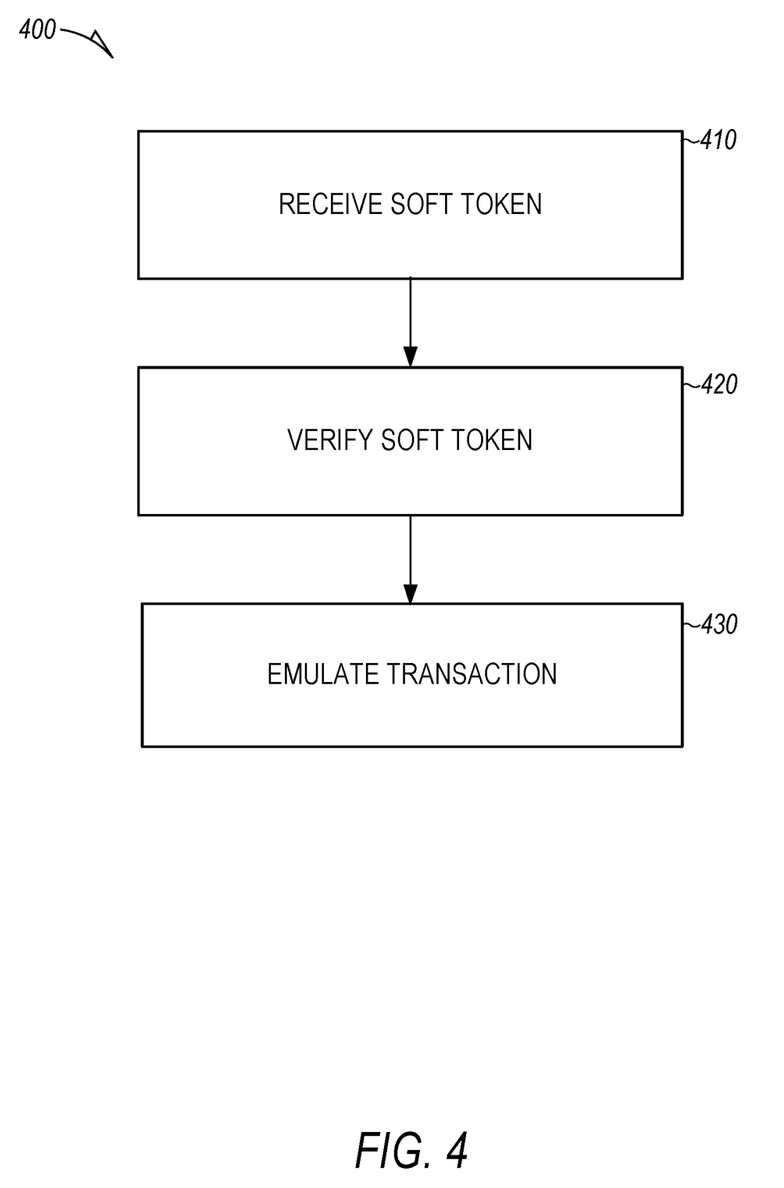
FIG. 4 is an example method of using a soft-token hardware accessory for reader knocking.

FIG. 4 is an example method of using a soft-token hardware accessory for reader knocking.

In example embodiments, a hardware accessory, separate from a PACS, is used against existing reader infrastructure of the PACS and a LACS. In example embodiments, a simple identity layer, such as Open ID Connect, is used on top of an authentication protocol, such as the OAuth 2.0 protocol, to allow verification of a user based on authentication performed by an Authorization Server, such as an Open ID Provider. In example embodiments, the hardware accessory includes an NFC antenna and an RTC module.

In example embodiments, at operation 410, the hardware accessory receives a soft token from an application executing on a client device of a user. In example embodiments, the application previously received the soft token (e.g., an ID token and access token) from an authentication service (e.g., via the local access control service(s) 120). In example embodiments, the application passes the soft token over Bluetooth or NFC to the hardware accessory. Thus, in example embodiments, the application provides login authentication and/or user consent and serves as a proxy for sending the soft token (e.g., token id) to the hardware accessory. In example embodiments, the application further provides optional support for multi-factor authentication scenarios.

At operation 420, the hardware accessory verifies the soft token, reads out information about the claims included in the soft token, and makes a decision about whether to knock the reader (e.g., to cause the reader to unlock a door).

At operation 430, based on a determination to perform the knocking, the hardware accessory emulates a transaction that a smart device, such as a smart card, associated with the PACS is configured to perform. For example, the hardware accessory may emulate a Seos transaction over Bluetooth or NFC to beep or activate the reader (e.g., to unlock a door).

In example embodiments, a certain user role may be required to perform the knocking. Thus, for example, if the payload of the token received by the hardware accessory does not include the required user role, the hardware accessory does not perform the knocking (e.g., a triggering of the reader to unlock a lock).

Figure 5:
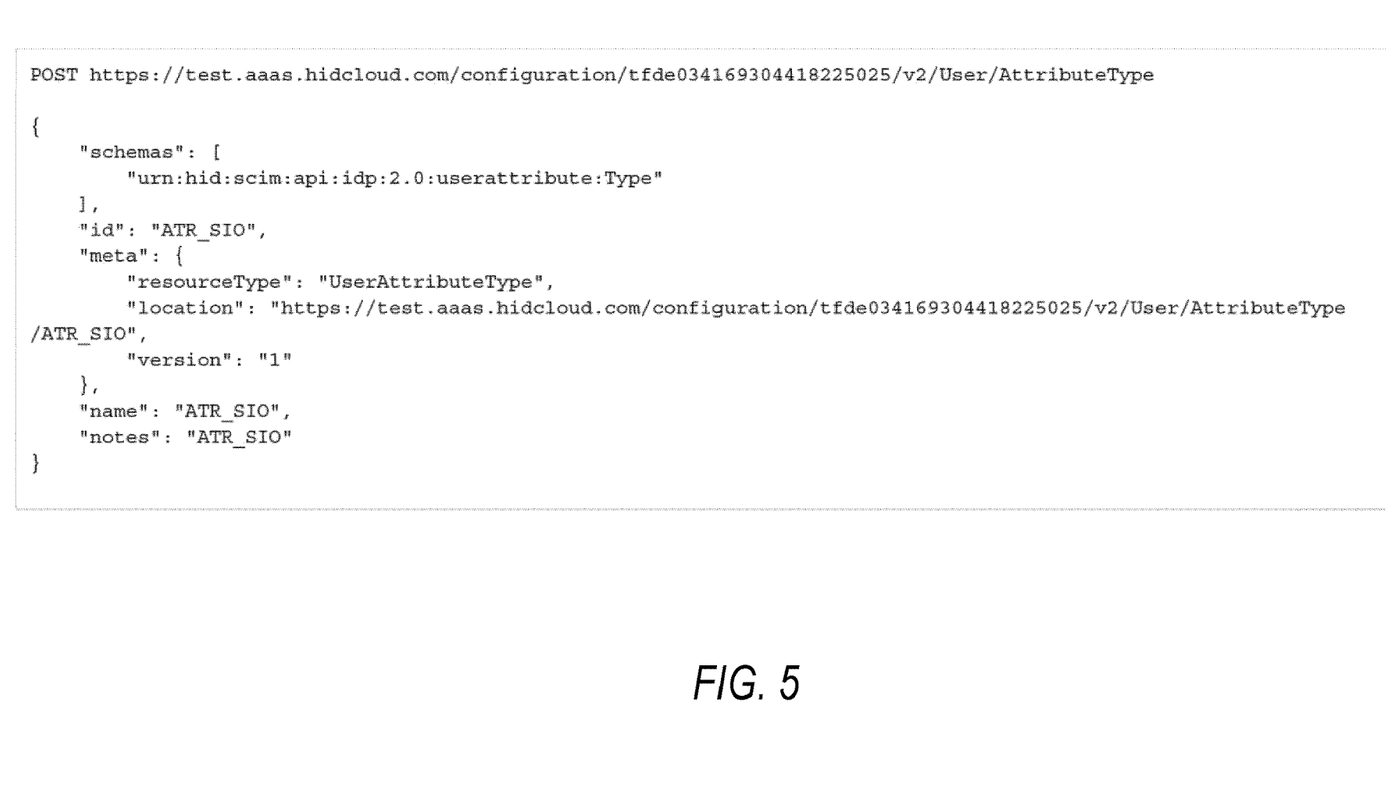
FIG. 5 shows an example code snippet for creating a custom attribute.

FIG. 5 shows an example code snippet for creating a custom SCIM attribute (e.g., ATR_SIO) that may, in example embodiments, be pushed under a user profile as a custom user attribute. This custom attribute may be populated with a static object, such as an SIO object, representing PACS data.

In example embodiments, the hardware accessory includes logic to extract and verity the JWT, as described above. Additionally, the hardware accessory may parse the custom attribute from the custom field and then dynamically build an ADF image that contains the user information (e.g., the SIO object) from a logical profile of the user.

FIG. 6 shows an exemplary JWT format. In this example, not only does the logical access control system (HID Authentication service) take part in the process of authentication and authorization of the end user, but also the reader itself relies on the user information (e.g., the SIO object) advertised by the accessory in the proxy mode and hence directly identifying the end-user on the reader.

FIG. 7 shows an exemplary JSON format response returned from an IdP server after a client registration (e.g., an OpenID dynamic client registration). In this example, during a configuration phase of the hardware accessory, a identify layer such as Open ID Connect is used for dynamic client registration, creating a mapping between the hardware accessary and a client ID (e.g., an Open Id Client ID). In example embodiments, the Client ID represents a concrete, individual accessary. The mapping process may be achieved exactly at the moment of pairing with the dedicated reader (e.g., using a dynamic OpenID Connect client registration POST request, as shown above). This mapping allows further encryption of JWT for presenting JWE format. In example embodiments, to support this example, the hardware accessory includes secure hardware shipped with a secure element.

In example embodiments, configuration of the hardware accessory and the associated process of key material provisioning could be further driven using a Constructor/Dispatcher service and its dedicated strategy. This technique may ensure fast re-provisioning of any key sensitive material in case of possible system compromising. For example, a Hotel Administrator could reconfigure Hardware Accessory using the service.

Provisioning of a public certificate (e.g., a JWKS public certificate) trusted by the accessory as well as the process of generation of RSA keys and OpenID connect dynamic registration may be performed at the same time. Once the accessory and the reader are associated, the logical association between reader, accessory and OpenID Client may be stored in a persistence layer of the service. As another example, in a PKI credential type flow, a private key representing the ClientID does not leave the secure storage of the accessory, thus enhancing security (e.g., for going through a security certification process).

This type of flow fits a business use case for hotels and similar enterprises. For example, assuming hotel facility has an old PACS (e.g., HID) reader infrastructure, this infrastructure may be leveraged by mounting hardware accessories inside of the existing rooms and paring them during the configuration process. Each accessory may be associated with an authentication service's tenant and manageable from the common user interface owned by the hotel.

A booking sequence may be established by allowing the user to register through the Hotel web page and creating the end-user account under the associated authentication service tenant. Authentication service ClientIDs would represent individual hardware accessories present in the individual Hotel's rooms. The process of authentication would allow the end-user to log in through the authentication service via the corresponding ClientID and end-user account and retrieve the soft token, leaving the ID token in the JWT or JWE format, trusted by hardware accessory.

FIG. 8 shows an exemplary JSON format response containing access token and id token (encoded) retruend by an IdP (E.g., in an OpenID Connect authorization flow). On the client device side logic, nothing is changed. In example embodiments, the hardware accessory is responsible for validating the signature (e.g., using a public certificate extracted from a trust store in the eSE) and then decrypting the JWE (e.g., using a private RSA key stored also in the eSE). Additionally, the hardware accessory may validate the corresponding ID token claims, as discussed above:

"exp": 1606746684, "roles": ["thebe" ], "ATR_SIO": "303381050187418813A5020500A609810281-700403030008A7178515BA2188E0F1B663C 07A443D670631A229E2C84EC465A90205000500"

In example embodiments, if the ClientID and its secret needs to be stored on the side of the application, there is a possibility of conducting a class of DOS attack against the authentication service (e.g., in case it is retrieved from the application).

One solution to this problem is to provide a pair of Client IDs and its secret as a result of an on-line checking process that would pass the ClientID and its secret in base64 form and hence enable the application to use it directly on the level of client credentials and then in the process of retrieving the authorization code that is used then to retrieve secret tokens (e.g., access token and id token).

Because the hardware accessory is representing in the authentication service as the ClientID (e.g., during dynamic client registration), this information can be passed back to the registered user (e.g., an account created under the authentication service) in a form of a pushed notification message directly to the application.

The user may then leverage an Authorization Code Flow with PKCE authentication in order to, for example, open doors in a hotel room. During the login process it would be then possible to benefit from the multifactor authentication options available directly on the IDP portla of the HID Authentication service. However as mentioned before the risk is that the ClientID and its secret will be exposed and then would require a change on the hardware accessory side. It could be a painful process from the perspective of the Hotel, so below variant attempts to hide the ClientID and the secret from the user and hence limit the need of reconfiguring the Hardware Accessory by deregistering the existing ClientID and registering a new ClientID every time a new user is booking the room.

The alternative flow proposition (e.g., a PKI Client Credential flow) may then be built based on the separate portal/service which would be then treated as the Private/Confidential client of the authentication service, where all ClientIDs and secrets associated to that service would be stored securely away from the external end-users.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 9:
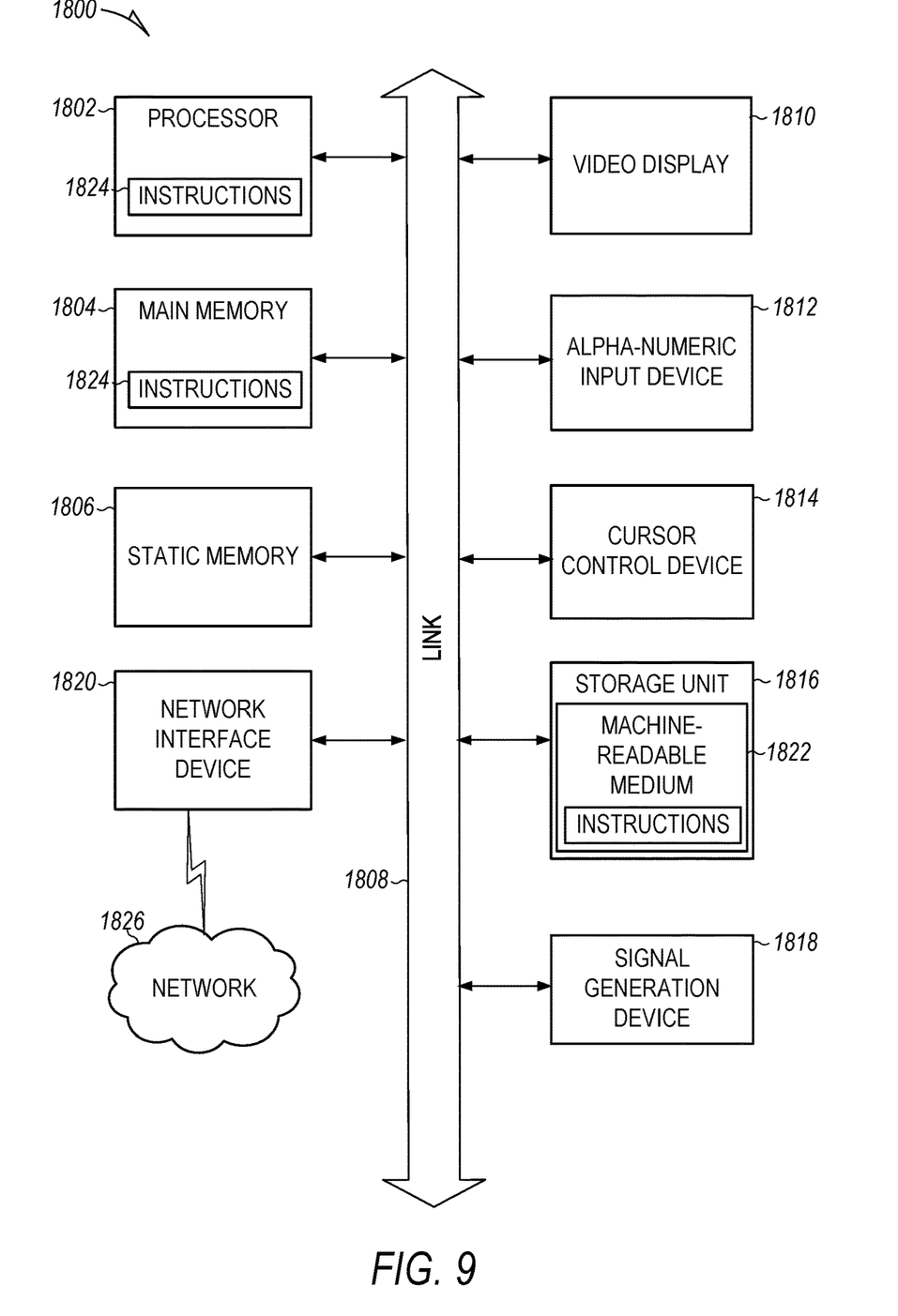
FIG. 9 is a block diagram of a machine in the example form of a computer system within which instructions for causing the machine to perform any one or more of the operations or methodologies discussed herein may be executed.

FIG. 9 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU), or both), a main memory 1804, and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816 (e.g., a disk drive unit), a signal generation device 1818 (e.g., a speaker), and a network interface device 1820.

The storage unit 1816 includes a machine-readable medium 1822 on which is stored one or more sets of instructions and data structures (e.g., software) 1824 embodying or utilized by any one or more of the methodologies or functions described herein. The instructions 1824 may also reside, completely or at least partially, within the main memory 1804 or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable storage medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., hypertext transfer protocol (HTTP)). Examples of communication networks include LANs, WANs, the Internet, mobile telephone networks, plain old telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 102. A machine-readable medium can comprise a machine-readable storage medium and a transmission medium.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

The invention claimed is:
1. A system comprising:
one or more computer processors;
one or more computer memories;
a set of instructions incorporated into the one or more computer memories, the set of instructions configuring the one or more computer processors to perform operations, the operations comprising, at a hardware accessory:
receiving a soft token from a client device of a user, the soft token having been generated or received at the client device based on an accessing of a logical profile of the user by the client device via one or more services of a logical access control system, the soft token including a payload, the payload including information about the user that is stored in the logical profile, the soft token being a JWE token that is decrypted using a private RSA key stored in a secure element of the hardware accessory;
based on a verifying of the soft token using a certificate extracted from a trust store of the hardware accessory, parsing the information about the user that is included in the payload; and
based on the information about the user satisfying one or more access criteria of a reader associated with a physical access control system, triggering the reader, the triggering including emulating a transaction associated with the physical access control system.

2. The system of claim 1, wherein the information about the user includes a role of the user.

3. The system of claim 1, wherein the information about the user includes a credential of the user, the credential associated with a smart card of the physical access control system, the smart card having been assigned to the user.

4. The system of claim 3, wherein the emulating of the transaction includes sending the credential to the reader over a secure connection in a format that is compatible with the physical access control system.

5. The system of claim 4, wherein the secure connection is a near field communication (NFC), Bluetooth connection, or other wireless connection.

6. The system of claim 3, wherein the credential is sent to the reader as a single object.

7. The system of claim 6, wherein the single object is a Secure Identity Object (SIO).

8. The system of claim 1, wherein the transaction is a Seos transaction.

9. The system of claim 1, wherein the soft token is a JWT token.

10. The system of claim 1, wherein the operations further comprise:
creating a logical association between the reader, the hardware accessory, and a client ID of the hardware accessory during a configuration phase, the creating of the logical association including simultaneously provisioning a public certificate, generating the private RSA key, and registering the client ID, the logical association resulting in the hardware accessory being represented as an element of a LACS, the hardware accessory being an element of a PACS; and
decrypting the JWE using the private RSA key.

11. The system of claim 10, wherein the registering of the client ID for the hardware accessory includes using a dynamic Open ID Connect client registration POST request, the POST request including a scope definition that defines a new scope or an existing scope, the scope definition allowing a client application to request a soft token based on the scope definition.

12. The system of claim 10, further comprising communicating the logical association to the client device for transmission to the logical access control system for storing in a persistence layer of the logical access control system.

13. A method comprising:
receiving a soft token from a client device of a user, the soft token having been generated or received at the client device based on an accessing of a logical profile of the user by the client device via one or more services of a logical access control system, the soft token including a payload, the payload including information about the user that is stored in the logical profile, the soft token being a JWE token that is decrypted using a private RSA key stored in a secure element of a hardware accessory;
based on a verifying of the soft token using a certificate extracted from a trust store of the hardware accessory, parsing the information about the user that is included in the payload; and
based on the information about the user satisfying one or more access criteria of a reader associated with a physical access control system, triggering the reader, the triggering including emulating a transaction associated with the physical access control system.

14. The method of claim 13, wherein the information about the user includes a role or a group of the user.

15. The method of claim 13, wherein the information about the user includes a credential of the user, the credential associated with a smart card of the physical access control system, the smart card having been assigned to the user.

16. The method of claim 15, wherein the emulating of the transaction includes sending the credential to the reader over a secure connection in a format that is compatible with the physical access control system.

17. The method of claim 13, further comprising:
creating a logical association between the reader, the hardware accessory, and a client ID of the hardware accessory during a configuration phase, the creating of the logical association including simultaneously provisioning a public certificate, generating a private RSA key, and registering the client ID; and
decrypting the JWE token using the private RSA key.

18. A non-transitory machine-readable medium storing a plurality of instructions that, when implemented by one or more computer processors, cause the one or more computer processors to perform operations, the operations comprising:
receiving a soft token from a client device of a user, the soft token having been generated or received at the client device based on an accessing of a logical profile of the user by the client device via one or more services of a logical access control system, the soft token including a payload, the payload including information about the user that is stored in the logical profile, the soft token being a JWE token that is decrypted using a private RSA key stored in a secure element of a hardware accessory;
based on a verifying of the soft token using a certificate extracted from a trust store of the hardware accessory, parsing the information about the user that is included in the payload; and
based on the information about the user satisfying one or more access criteria of a reader associated with a physical access control system, triggering the reader, the triggering including emulating a transaction associated with the physical access control system.

19. The non-transitory machine-readable medium of claim 18, wherein the information about the user includes a role of the user.

20. The non-transitory machine-readable medium of claim 18, wherein the information about the user includes a credential of the user, the credential associated with a smart card of the physical access control system, the smart card having been assigned to the user.

\* \* \* \* \*